(12) United States Patent
Liao

(10) Patent No.: US 7,389,955 B2
(45) Date of Patent: Jun. 24, 2008

(54) WINDING REEL DEVICE WITH ADDITIONAL WINDING UNIT

(76) Inventor: Sheng-Hsin Liao, No. 10, Alley 38, Lane 229, San Chun St., Shulin City, Taipei Hsien (TW)

( * ) Notice: Subject to any disclaimer, the term of this patent is extended or adjusted under 35 U.S.C. 154(b) by 0 days.

(21) Appl. No.: 11/699,565

(22) Filed: Jan. 30, 2007

(65) Prior Publication Data
US 2007/0119999 A1    May 31, 2007

Related U.S. Application Data

(62) Division of application No. 11/086,451, filed on Mar. 23, 2005, now abandoned.

(30) Foreign Application Priority Data
Jan. 18, 2005    (TW) ............................... 94200953 U

(51) Int. Cl.
*B65H 75/48* (2006.01)
(52) U.S. Cl. .................................. 242/378.1
(58) Field of Classification Search ................. 242/378, 242/388, 388.6, 378.1, 379, 385, 385.4, 388.1, 242/378.4; 191/12.4, 12.2 R
See application file for complete search history.

(56) References Cited

U.S. PATENT DOCUMENTS

| | | | | |
|---|---|---|---|---|
| 6,199,784 | B1 * | 3/2001 | Wang et al. | 242/378 |
| 6,446,898 | B1 * | 9/2002 | Hwang | 242/378.1 |
| 6,497,378 | B1 * | 12/2002 | Liao | 242/378.1 |
| 6,644,582 | B1 * | 11/2003 | Liao | 242/378.1 |
| 6,803,525 | B1 * | 10/2004 | Liao | 174/135 |
| 6,834,820 | B2 * | 12/2004 | Wei | 242/378 |
| 7,201,342 | B2 * | 4/2007 | Huang | 242/378.2 |
| 2004/0129820 | A1 * | 7/2004 | Liao | 242/378.1 |
| 2005/0194486 | A1 * | 9/2005 | Huang | 242/378.4 |
| 2006/0186248 | A1 * | 8/2006 | Liao | 242/378 |

* cited by examiner

*Primary Examiner*—Peter M. Cuomo
*Assistant Examiner*—William E Dondero
(74) *Attorney, Agent, or Firm*—Rosenberg, Klein & Lee

(57) ABSTRACT

A winding reel device with an additional winding unit has a winding box with two cavities and a partition arranged therebetween, first and second reel plates rotatably disposed inside the two cavities, respectively, first and second connection wires lapped about the first and second reel plates, respectively, and first and second vortex springs connected between the first reel plate, the second reel plate and the winding box.

5 Claims, 6 Drawing Sheets

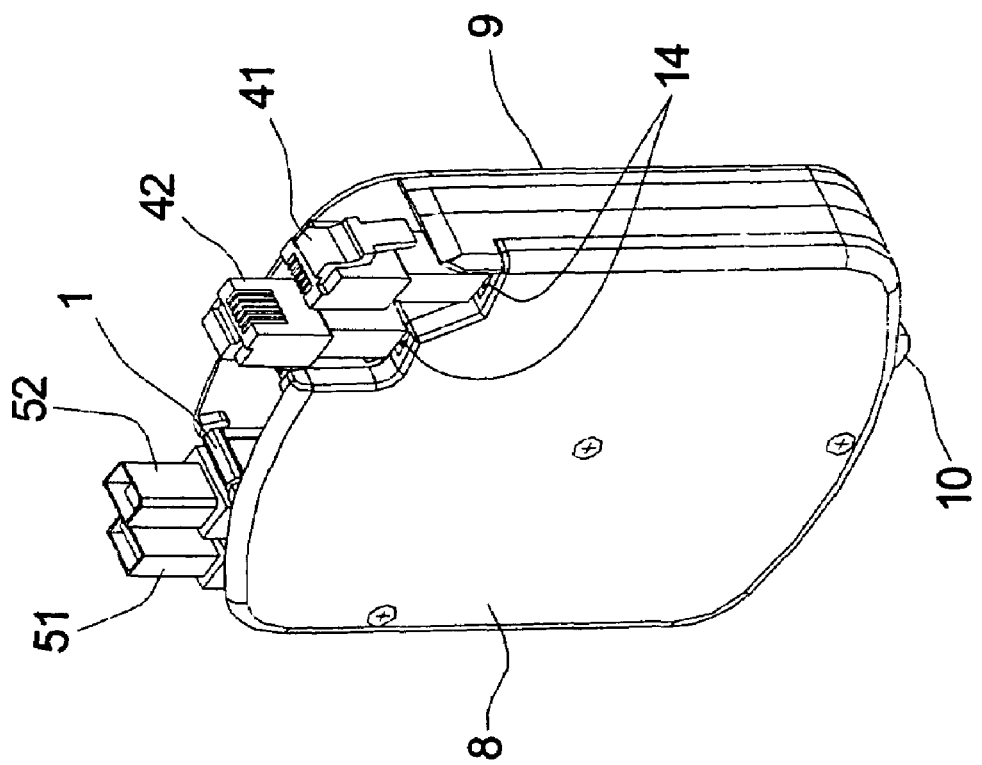

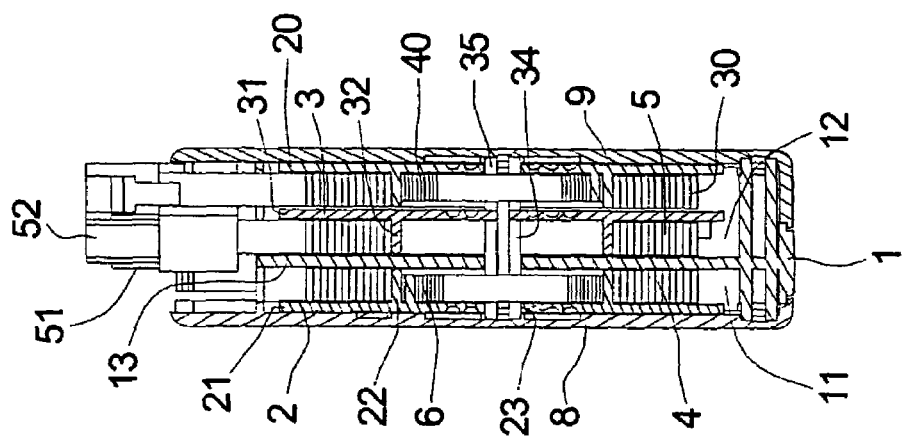
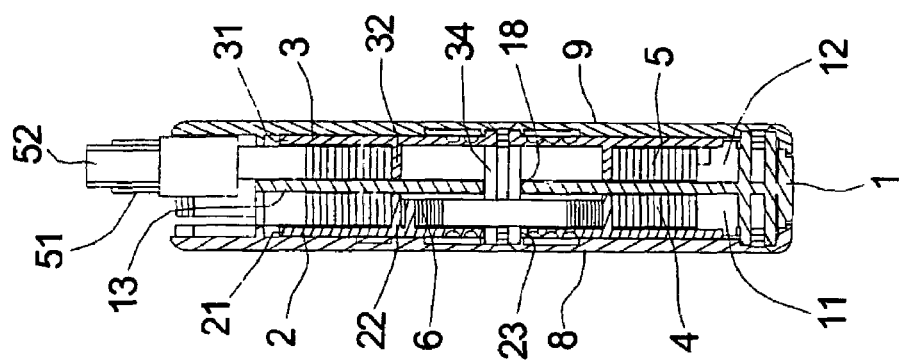
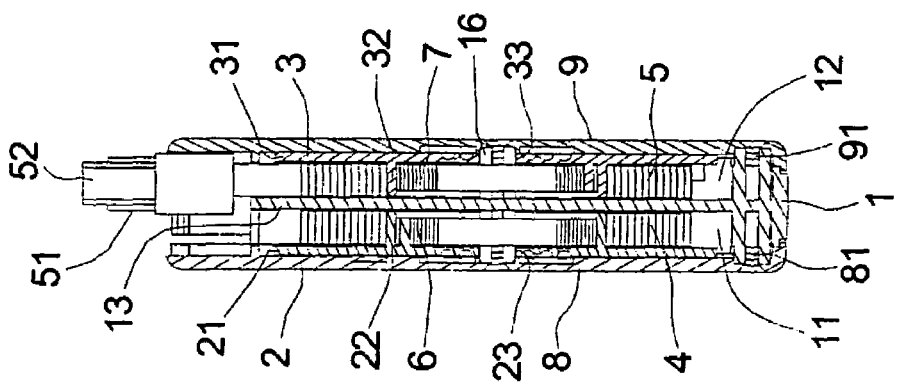

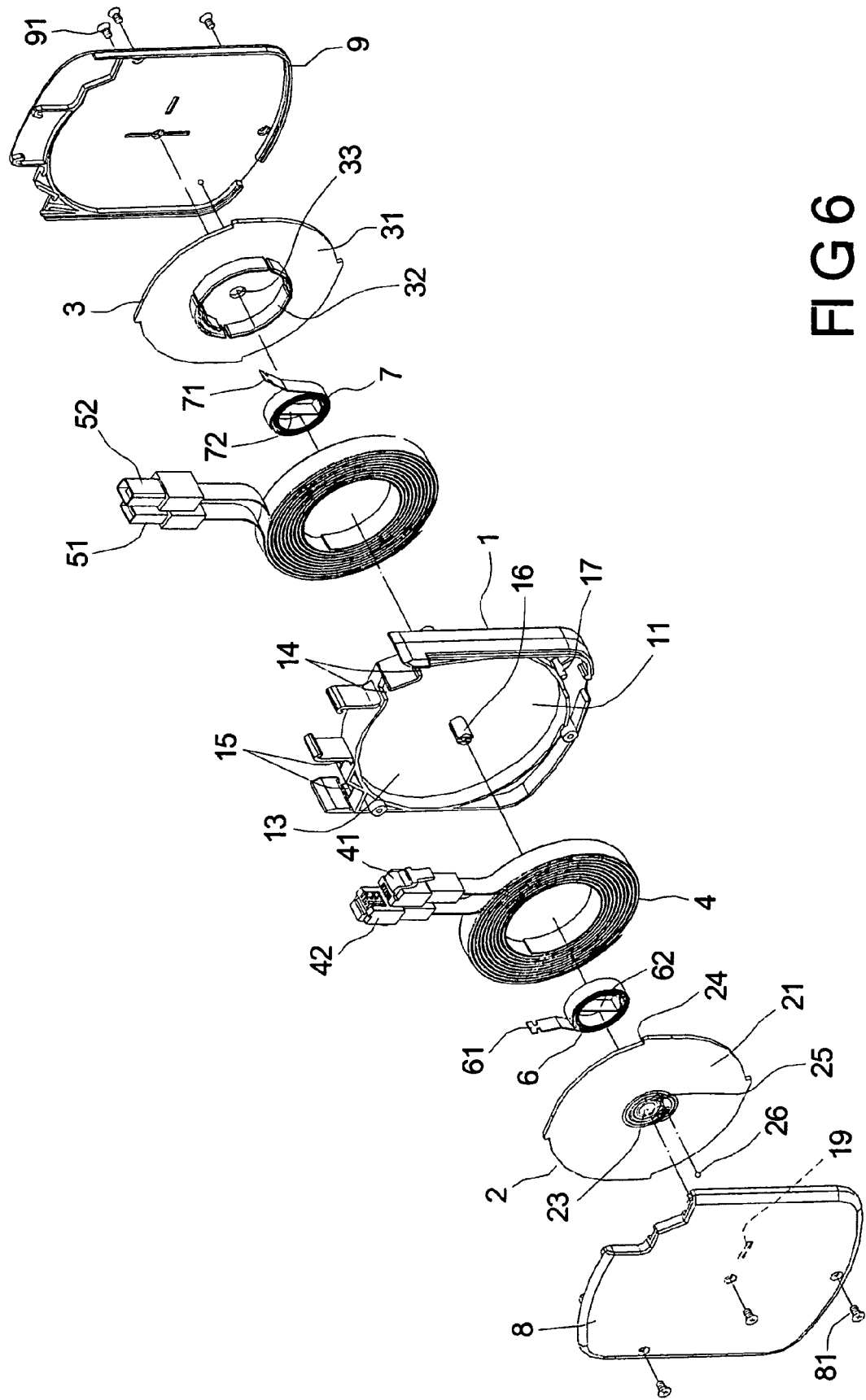

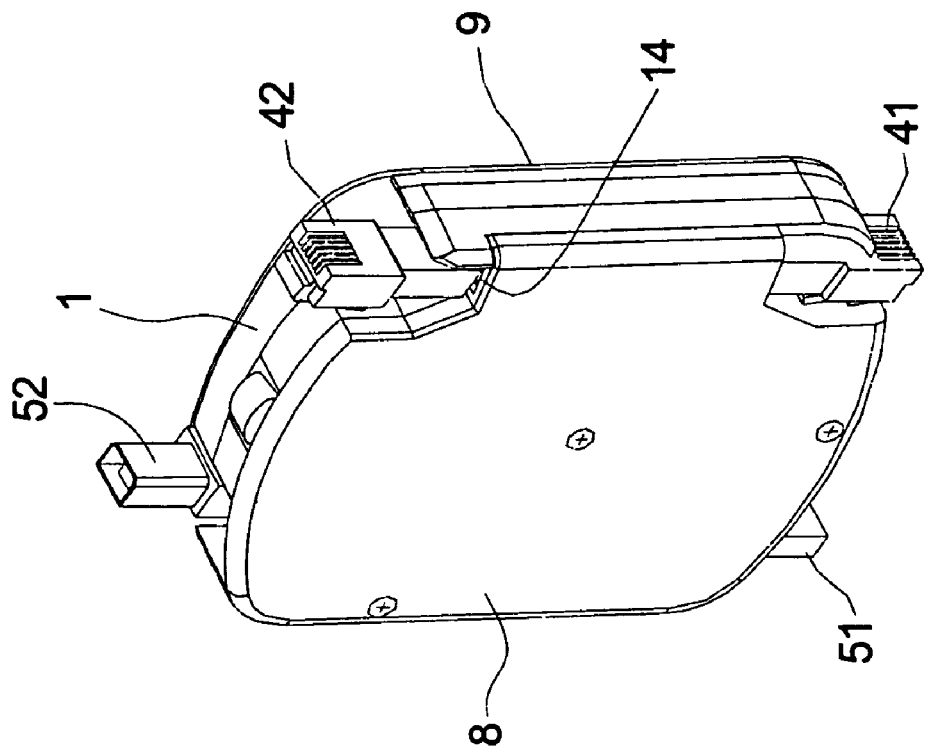
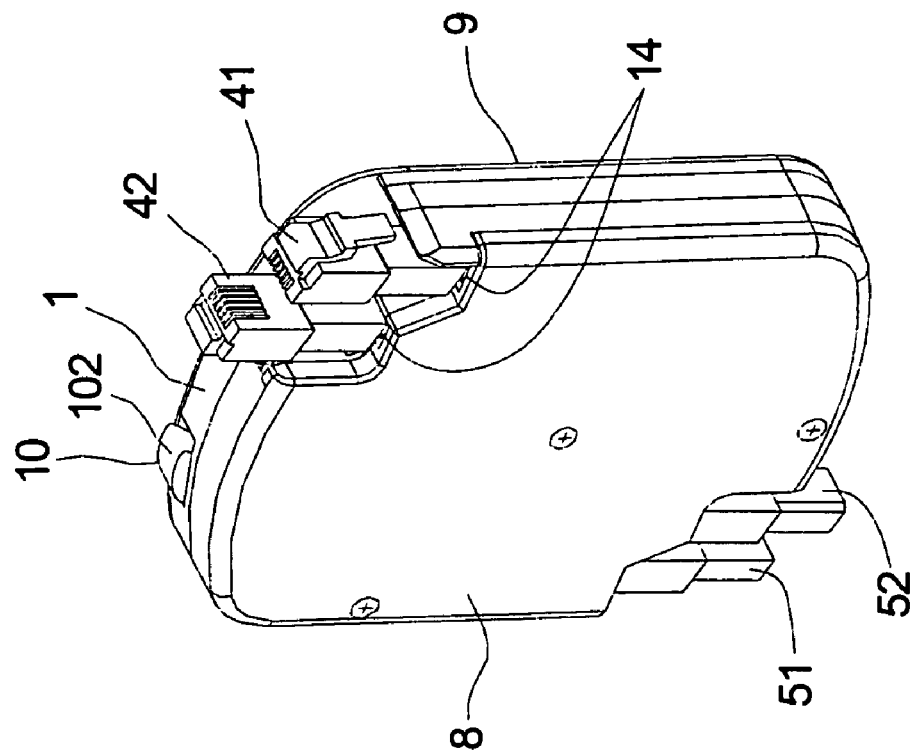

WINDING REEL DEVICE WITH ADDITIONAL WINDING UNIT

RELATED APPLICATIONS

This application is a Divisional patent application of application Ser. No. 11/086,451, filed on Mar. 23, 2005 now abandoned.

BACKGROUND OF THE INVENTION

1. Field of the Invention

The present invention relates to a winding reel device, and particularly relates to a winding reel device with an additional winding unit for broad and easy application thereof.

2. Background of the Invention

Connection wires are required by, for example, computers, modems, telephones, and facsimile machines, if communication therebetween is to be accomplished. Many wires or long wires make a mess, but insufficiently long short wires are not useful. A solution to this problem is a winding reel device. A conventional winding reel device includes a box, a connection wire, a winding reel and a vortex spring, so that a plug disposed on the connection wire is inserted into a respective socket of a communication device for exchanging information.

In addition, the connection wire of the conventional winding reel device is stretched tightly due to a strong resilient force from the vortex spring, and the connection wire cannot maintain a proper length outside the box thereof. The redundant section of the connection wire are very troublesome to the user. A resilient swing member mates with a cutout and an engaging slot of a peripheral of a reel plate for orientation or roll back.

However, the conventional winding reel device includes only one winding unit composed of a connection wire and a reel plate. The number of winding units cannot be increased to meet extension requirements and the winding reel device is limited thereby. Alternatively, adding another winding unit will make the size thereof thicker than that of the conventional winding reel device, and is inconvenient for the user.

SUMMARY OF INVENTION

A winding reel device with an additional winding unit provides two cavities inside the box for receiving two or more winding units, respectively, so as to meet the extension requirement for broad and convenient application.

The winding reel device with an additional winding unit is provided to increase the number of winding units, and each connection wire reeled inside each winding unit is lapped over and over to decrease the thickness of the device.

A winding reel device with an additional winding unit includes a winding box having two cavities and a partition arranged therebetween, first and second reel plates rotatably disposed inside the two cavities, respectively, first and second connection wires lapped about the first and second reel plates, respectively, and first and second vortex springs connected between the first reel plate, the second reel plate, and the winding box.

To provide a further understanding of the invention, the following detailed description illustrates embodiments and examples of the invention. Examples of the more important features of the invention have thus been summarized rather broadly in order that the detailed description thereof that follows may be better understood, and in order that the contributions to the art may be appreciated. There are, of course, additional features of the invention that will be described hereinafter, which will form the subject of the claims appended hereto.

BRIEF DESCRIPTION OF THE DRAWINGS

These and other features, aspects, and advantages of the present invention will become better understood with regard to the following description, appended claims, and accompanying drawings, where:

FIG. 2 is a perspective view of the first embodiment of the winding reel device according to the present invention;

FIG. 3 is a cross-sectional profile of the first embodiment of the winding reel device according to the present invention;

FIG. 4 is a cross-sectional profile of a second embodiment of the winding reel device according to the present invention;

FIG. 5 is a cross-sectional profile of a third embodiment of the winding reel device according to the present invention;

FIG. 6 is an exploded view of a fourth embodiment of the winding reel device according to the present invention;

FIG. 7 is a perspective view of a fifth embodiment of the winding reel device according to the present invention;

FIG. 8 is a perspective view of a sixth embodiment of the winding reel device according to the present invention.

DETAILED DESCRIPTION OF THE EMBODIMENTS

Figure 1:
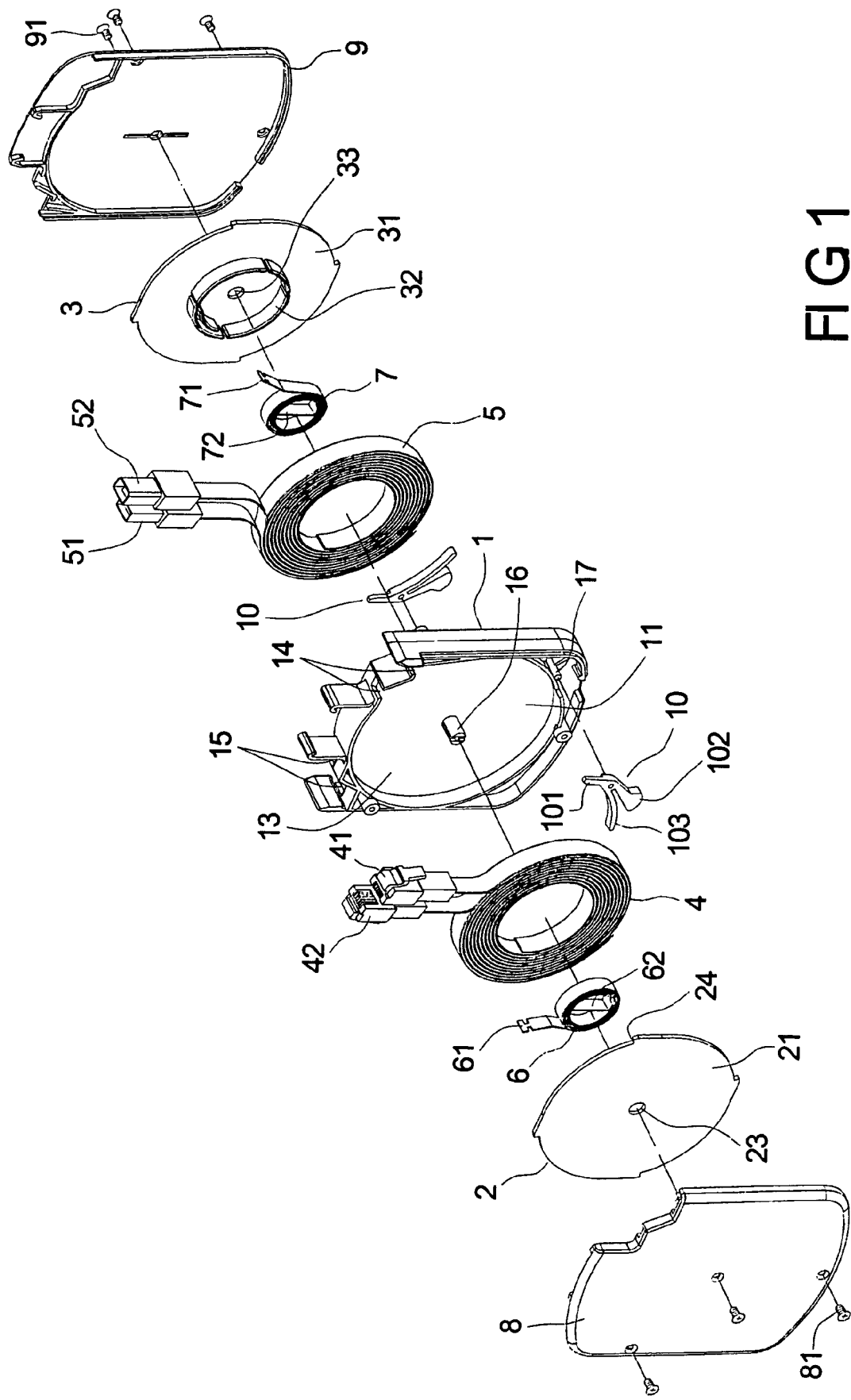
FIG. 1 is an exploded view of a first embodiment of a winding reel device according to the present invention.

With respect to FIGS. 1 to 3, a preferred embodiment of a winding reel device according to the present invention is illustrated. The winding reel device with an additional winding unit includes a winding box 1 having two cavities 11 and 12. A partition 13 is arranged therebetween to separate the two cavities 11 and 12. First and second reel plates 2 and 3 are rotatably disposed inside the two cavities, respectively. First and second connection wires 4 and 5 are lapped about the first and second reel plates 2 and 3, respectively. First and second vortex springs 6 and 7 are connected between the first reel plate 2, the second reel plate 3 and the winding box 1. First and second caps 7 and 8 cover the two cavities, respectively. The winding box 1 is hollow. The first cavity 11 receives the first reel plate 2, the first connection wire 4 and the first vortex spring 6. The second cavity 12 receives the second reel plate 3, the second connection wire 5 and second first vortex spring 7. The winding box 1 further includes first and second slits 14 and 15 adjacent to the two cavities 11 and 12, respectively, to stretch out the first and second connection wires 4 and 5, respectively. The winding box 1 includes a protrusion axle 16 vertical to the partition 13 thereof; the protrusion axle 16 extends into the two cavities 11 and 12. The first and second reel plates 2 and 3 pivot on the protrusion axle 16 via central holes 23 and 33 therein.

The first reel plate 2 includes a first plate body 21 and a first reel shaft 22, which is hollow and disposed on a respective surface of the plate body 21. The first reel plate 2 can rotate inside the first cavity 11 by pivoting on the protrusion axle 16 in the central hole 23.

The second reel plate 3 includes a second plate body 31 and a second reel shaft 32, which is hollow and disposed on a respective surface of the plate body 31. The second reel plate 3 can rotate inside the second cavity 12 by the protrusion axle 16 pivoting in the central hole 32.

The first connection wire 4 has plugs 41 and 42 disposed at two ends thereof respectively. The plugs 41 and 42 can be RJ45, USB typed plugs or connectors. Alternatively, the plugs 41 and 42 can also be earphones. The first connection wire 4 winds around the first reel shaft 22 of the first reel plate 2, and two ends of the first connection wire 4 stretch outwardly via the first slits 14.

The second connection wire 5 has plugs 51 and 52 disposed at two ends thereof, respectively. The plugs 51 and 52 can be RJ55, USB typed plugs or connectors. Alternatively, the plugs 51 and 52 can also be earphones. The second connection wire 5 winds around the second reel shaft 32 of the second reel plate 3, and two ends of the second connection wire 5 stretch outwardly via the second slits 15. The first and the second connection wires 4 and 5 can extend in various directions, as illustrated in FIGS. 7 and 8.

The first vortex spring 6 is disposed inside the winding box 1, and the first vortex spring 6 is disposed between the first reel plate 2 and the winding box 1. The first vortex spring 6 has a first clamp end 61 engaging with the first reel plate 2 and a second clamp end 62 engaging with the protrusion axle 16 of the winding box 1. The first vortex spring 6 connects between the first reel plate 2 and the winding box 1 to store energy while the first reel plate 2 rotates.

The second vortex spring 7 is disposed inside the winding box 1, and the second vortex spring 7 is disposed between the second reel plate 3 and the winding box 1. The second vortex spring 7 has a third clamp end 71 engaging with the second reel plate 3 and a fourth clamp end 72 engaging with the protrusion axle 16 of the winding box 1. The second vortex spring 7 connects between the second reel plate 3 and the winding box 1 to store energy while the second reel plate 3 rotates.

The first cap 8 and the second cap 9 correspond to each other to enclose the cavities 11 and 12. The first and second caps 8 and 9 connect to the winding box 1 via screws 81, 91 or clamping methods. The reel plates 2 and. 3, the connection wires 4 and 5, the vortex springs 6 and 7 can be received inside the cavities 11 and 12.

The first reel plate 2, the first connection wire 4 and the first vortex spring, 6 are combined into a first winding unit. The second reel plate 3, the second connection wire 5 and the second vortex spring 7 are combined into a second winding unit. In practice, the winding reel device retracts the redundant length of the first and second connection wires 4 and 5. The plug 41, 42; 51 and 52 of the connection wires 4 and 5 can be applied with relative communication sockets. Each of the connection wires 4 and 5 has an end secured to the vortex springs 6 and 7 to keep the resilient force to draw the wires 4 and 5 back, and allowing the wires to remain neatly arranged.

In addition, to prevent the inconvenience implements of the connection wires 4 and 5 due to the resilient force, the winding box 1 includes at least one clamping bottom 10 pivoted to a lateral side thereof via a pivot shaft 17 thereof. The clamping bottom 10 has a clamping portion 101 and a press portion 102 at each end thereof, and the clamping portion 101 further includes a resilient arm 103 extending between the clamping portion 101 and the press portion 102, so that the resilient arm 103 abuts against the winding box 1 and the clamping portion 101 engages with an one-way slot 24 formed on an exterior edge of at least one of the reel plates 2 and 3. When the clamping portion 101 resiliently engages with the slot 24 of the reel plate 2, the user is not affected by the resilient force due to the stretching out of the first connection wire 4. The connection wire 4 is fixed after being stretched out.

When the press portion 102 is pressed, the press portion 102 releases the clamping portion 101 from the slot 24 of the first reel plate 2, and the stretched connection wire 4 can be retracted by the resilient force of the first vortex spring 6. The winding box 1 has an additional clamping bottom 10 to engage with the second reel plate 3, so that the resilient force of the second connection wire 5 will not affect the user when the second vortex 7 is retracted.

In addition, the second plate body 31 of the second reel plate 3 illustrated in FIG. 4 has a central shaft 34 extending from a center thereof to penetrate through an axle hole 18 of the partition 13 and the central hole 23 of the first reel plate 2, so that the first and second reel plates 2 and 3 pivot inside the two cavities 10 and 11 via the central shaft 34, and the first and the second reel plates 2 and 3 are connected as a whole. In this embodiment, only the first vortex spring 6 is required to connect the central shaft 34 of the second reel plate 3 and the first reel plate 2.

The second reel plate 2 illustrated in FIG. 5 has a connection shaft 35 extending therefrom for pivoting a third reel plate 20. The winding reel device includes a third reel plate 20 disposed inside a respective one of the two cavities 10 and 11. A third connection wire 30 is wound around the third reel plate 20. The second vortex spring 7 connects the third reel plate 20 and the second reel plate 3. Thus, a third winding unit is combined.

Figure 9:
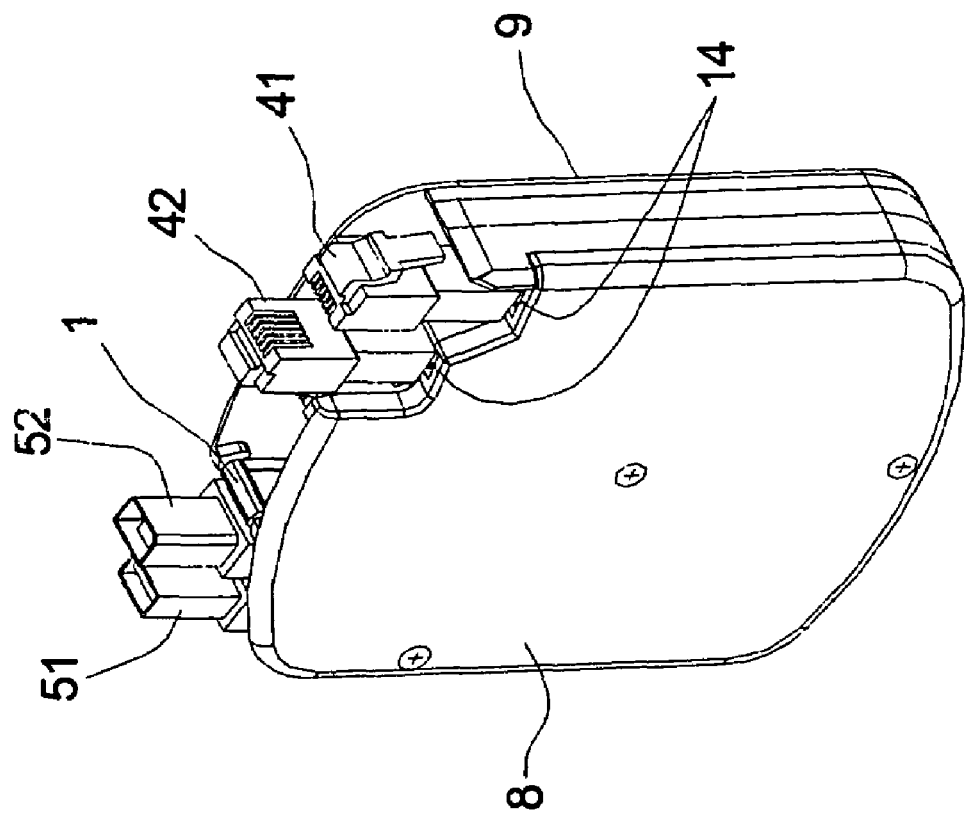
FIG. 9 is a perspective view of the fourth embodiment of the winding reel device according to the present invention.

FIGS. 6 and 9 illustrate the first and the second reel plates 2 and 3 have a track 25 and a rolling ball 26 arranged in the track 25. At least one of the two caps 8 and 9 has a limit slot 19, formed in an inner surface thereof, so as to mate with the rolling ball 26. Due to the restriction between the rolling ball 26 and the limit slot 19, the connection wires 4 and 5 can be extracted and retracted, repeatedly.

The winding box 1 according to the present invention is divided in two, and the two cavities 11 and 12 and formed, to receive two or three winding units for meeting extension requirement. Furthermore, the first, second and third connection wires 4, 5 and 30 lap over and over about the first and second reel plates, respectively, to diminish the thickness of the winding reel device.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A winding reel device with an additional winding unit, the winding reel device comprising:
    a closed contour winding box having a partition positioned within said closed contour winding box defining a first closed cavity and a second closed cavity in axial alignment each to the other, said first and second closed cavities defining a respective first cavity wall and a second cavity wall, each of said first and second cavity walls having a pair of respective slits formed therethrough;
    a first reel plate and a second reel plate rotatably disposed respectively inside the two closed cavities, wherein the first reel and the second reel plates are connected as a whole through a central shaft joining said first reel and second reel plates;
    a pair of first spirally formed connectors mounted in a spirally alternating manner each with respect to the other and lapped about said first reel plate in said first closed cavity for extension through said pair of slits formed through said first cavity wall;
    a pair of second spirally formed connectors mounted in a spirally alternating manner each with respect to the other and lapped about said second reel plate in said second closed cavity for extension through said pair of slits formed through said second cavity wall; and, a single vortex spring connected between the first reel plate and the second reel plate for rotatably displacing said first and second reel plates as a whole.

2. The winding reel device as claimed in claim 1, wherein the second reel plate has a reel shaft extending to penetrate through an axle hole of the partition and a central hole of the first reel plate, whereby the first and second reel plates pivot inside the two cavities via the central shaft.

3. The winding reel device as claimed in claim 2, wherein the vortex spring connects between the reel shaft of the second reel plate and the first reel plate.

4. The winding reel device as claimed in claim 1, further including a third reel plate disposed inside a respective one of the two cavities, a third connection wire wound around the third reel plate, and a second vortex spring connecting the third reel plate and the second reel plate.

5. The winding reel device as claimed in claim 4, wherein the second reel plate has a central shaft extending from a center thereof to penetrate through an axle hole of the partition and a central hole of the first reel plate, whereby the first and second reel plates pivot inside the two cavities via the central shaft, and the second reel plate has a connection shaft extending therefrom for pivoting the third reel plate.

* * * * *